United States Patent
Reed

[11] Patent Number: 5,987,807
[45] Date of Patent: Nov. 23, 1999

[54] FISHING LINE FLOAT

[75] Inventor: Gerald D. Reed, Independence, Mo.

[73] Assignee: Rieadco Corp., Cameron, Mo.

[21] Appl. No.: 08/696,342

[22] Filed: Aug. 13, 1996

[51] Int. Cl.⁶ .................................................. A01K 93/00
[52] U.S. Cl. ........................................ 43/44.87; 43/44.95
[58] Field of Search ................................ 43/44.87, 44.92, 43/44.95

[56] References Cited

U.S. PATENT DOCUMENTS

| | | | |
|---|---|---|---|
| 1,371,170 | 3/1921 | Johnson | 43/44.95 |
| 2,560,129 | 7/1951 | Rhotehamel | 43/44.95 |
| 2,670,560 | 3/1954 | Matras | 43/44.95 |
| 2,842,888 | 7/1958 | Landrum | 43/44.95 |
| 3,060,621 | 10/1962 | Schmidt | 43/44.95 |
| 3,142,930 | 8/1964 | Lambach | 43/44.95 |
| 3,204,363 | 9/1965 | Dunham | 43/44.95 |
| 3,925,920 | 12/1975 | Walker | 43/44.95 |
| 4,426,805 | 1/1984 | Riead | 43/44.95 |
| 4,506,471 | 3/1985 | Riead | 43/44.87 |

*Primary Examiner*—Kurt Rowan
*Attorney, Agent, or Firm*—Shook, Hardy & Bacon LLP

[57] ABSTRACT

A fishing line float is disclosed. The float may be mounted securely to a fixed point along the line or in a manner whereby the float may travel along the line. The float includes a buoyant body having a recess therein. A line guide head is mounted on the end of a stem extending through the recess. A plunger is movably mounted on the stem between the head and body. The plunger includes a recessed area for acceptance of the head, the plunger spring-biased against the head. The plunger and head include a slot and a grove respectively which, when aligned, form an enclosed straight-line passage through them for mounting the float in movable fashion on a fishing line. The head Includes a notch through which the line may extend before wrapping around the head between the head and plunger. A tab on the plunger extends partially into the notch to prevent the line from pulling from its locked position.

12 Claims, 1 Drawing Sheet

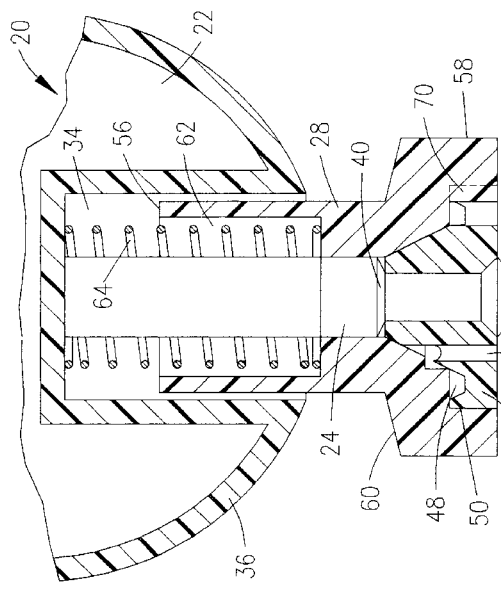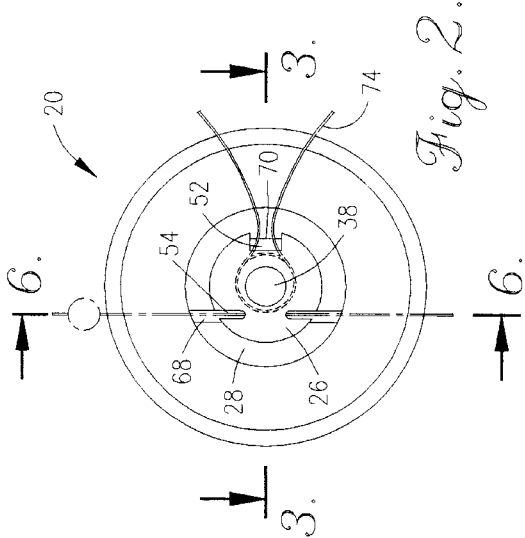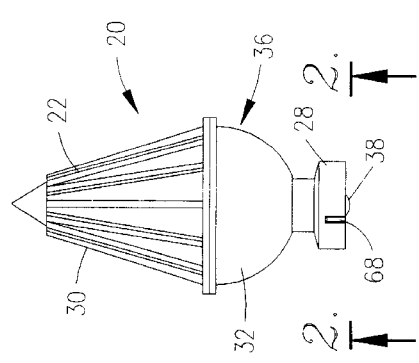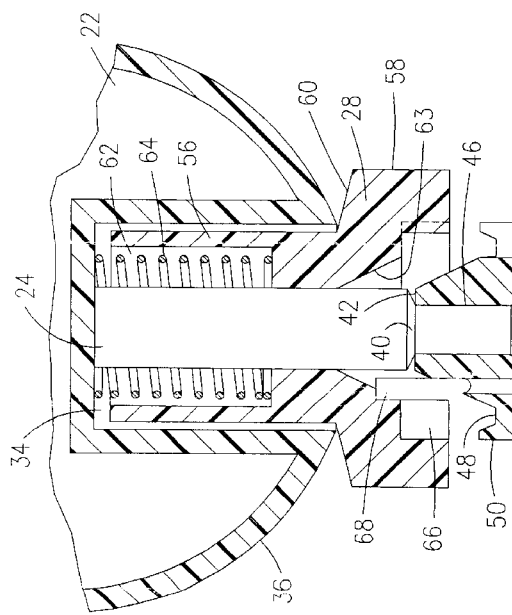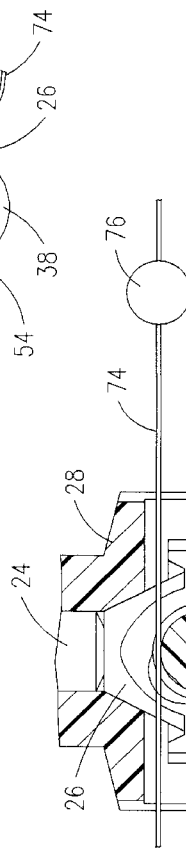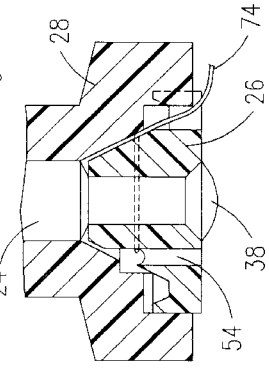

FISHING LINE FLOAT

FIELD OF THE INVENTION

The present invention relates to a fishing line float. More particularly, the invention is fishing line float having a line attachment which allows the float to be fixed in one position along the line, or mounted on the line so as to be freely movable therealong.

BACKGROUND OF THE INVENTION

Fishing line floats or "bobbers" are buoyant, normally brightly colored elements located on a fishing line between the rod and hook. The fishing line float normally consists of a sealed hollow member or other buoyant member having an attachment for a fishing line.

The fishing line float is utilized to set the depth of the hook in the water and/or utilized as a visual indicator that a fish has hit the hook. When used as a depth controller, the fishing line float is positioned a desired distance along the line from the hook. The fishing line float floats on the surface of the water, support the remaining line and hook therebelow.

When used as a fish hit indicator the fishing line float is mounted on the line so that when a fish bites the hook, it moves the float or pulls it under the water for at least a short period of time. The bright color of the float makes it easy for a fisherman to notice the movement of the float, thereby giving him notice that a fish has hit the hook and must be snagged and reeled in.

In some instances, for example where a fisherman is fishing off of the side of a boat, the fisherman desires to fix the fishing line float at a particular point along the line. In this instance, the fishing line float must be securely attached to the line so as not to move with respect to the line.

In other instances, such as when a fisherman is fishing from the bank and must cast outward therefrom, the fisherman may desire that the fishing line float move with respect to the line. When the fishing line float is fixed, some trailer portion of the line and the hook extend beyond the float. When casting, this trailer portion of the line may become tangled with the remainder of the line and the like. It is therefore often desirable when casting to have the float positioned near the hook. On the other hand, once the line is cast, it is desirable for the line to move with respect to the float so that the hook is positioned in the water some distance below the float.

A fishing line float which a fisherman may attach securely to a line or in free fashion so as to move with respect to the line is desired.

SUMMARY OF THE INVENTION

The present invention is a fishing line float adapted for attachment to a fishing line in two ways. First, a user may mount the float securely to a fishing line at a fixed point. Second, a user may mount the float to a fishing line in a manner whereby the float may move freely along the fishing line. The fishing line float of the present invention comprises a buoyant float body having a recess therein, a stem extending through the recess to a distal end thereof located outward of the float body, a line guide head connected to the distal end of the stem, and a biased plunger located on the stem between the float body and line guide head.

The float body is a buoyant element of the type generally known in the art for use as a fishing line float or bobber. A cylindrical recess is located on the body, with a stem extending through the recess from the body to a point located outside of the body.

A line guide head is positioned at the distal end of the stem outward of the body. The line guide head is generally conical in shape, thereby having a smaller diameter end and a larger diameter end. The smaller diameter end is also called a first or top end. The larger diameter end is also called a second or bottom end. The line guide head is oriented with the smaller diameter top end facing the float body.

The plunger is an annular member having an outer wall having a first end positioned within the recess of the float body and over the stem, and a second end adapted for engagement over the line guide head. A spring is mounted between a portion of the plunger and the float body, biasing the plunger towards the line guide head.

Locking means are provided for mounting the float to a fishing line in a secure manner at a fixed point along the line. Preferably, these means comprise mating line engagement areas on the plunger and line guide head. In particular, a trough extends into the large diameter bottom end of the line guide head, and an upwardly extending rim extends around the trough along the periphery of the bottom end of the line guide head. Further, a notch extends radially inward of the peripheral edge of the head at its bottom end. The second end of the plunger includes a recessed area for acceptance of the conical shaped line guide head, including the upwardly extending rim. Further, a tab extends inwardly from the wall of the plunger for partial extension into the notch in the head.

In use, a fisherman extends a fishing line between the plunger and line guide head. The line enters the notch between the head and tab on the plunger, extends upwardly inside of the rim along the trough and around the conical section of the head, and back down inside of the rim where it exits the notch. The line is prevented from moving with respect to the float by the frictional force generated by the pressure of the spring which pinches the line between the plunger and line guide head. Further, the line is prevented from being displaced from its locked position. The upwardly extending rim which extends into the plunger, as well as the tab extending into the notch, prevents the line from sliding out of engagement with the float.

Means are also provided for mounting the float movably along a fishing line. A groove extends into the line guide head opposite the notch. The slot extends partially into the peripheral edge of the head at the bottom end, partially into the conical section, and back down through the peripheral edge of the head on the other side. A mating slot is positioned in the plunger. This slot extends through the wall of the plunger on opposite sides thereof.

In use, the plunger extends over the line guide head with the slot and groove aligned to form an enclosed straight-line passage therethrough. A fishing line extends through the passage. This mounting secures the float to the fishing line in a manner whereby the float may move along the fishing line.

Further objects, features, and advantages of the present invention over the prior art will become apparent from the detailed description of the drawings which follows, when considered with the attached figures.

DESCRIPTION OF THE DRAWINGS

FIG. 1 is a side view of the fishing line float of the present invention;

FIG. 2 is a bottom view of the fishing line float of FIG. 1 as viewed along line 2—2 thereof;

FIG. 3 is a cross-sectional side view of the fishing line float of FIG. 2 taken along line 3—3 thereof;

FIG. 4 is the view of the fishing line float of FIG. 3 with a plunger of said fishing line float illustrated in a depressed position;

FIG. 5 is a partial cross-sectional view of the fishing line float mounted on a fishing line in a first, locked position; and FIG. 6 is a partial cross-sectional view of the fishing line float of FIG. 2 taken along line 6—6 thereof and illustrated mounted freely on a fishing line.

DETAILED DESCRIPTION OF THE PREFERRED EMBODIMENT

FIG. 1 illustrates a fishing line float 20 in accordance with the present invention. In general, the fishing line float 20 comprises a float body 22 having a stem 24 extending downwardly therefrom, a line guide head 26 positioned at the distal end of the stem 24, and a plunger 28 movably mounted over the stem between the line guide head 26 and float body 22.

The line guide head 26 and plunger 28 are adapted to allow the fishing line float 20 to be attached to a fishing line in one of two manners. In a first method of attachment, a fishing line is positioned between the plunger 28 and head 26, with the plunger biased in the direction of the head, so as to lock the fishing line float 20 to the fishing line and not be moveable with respect thereto. In a second method of attachment, a fishing line extends through a straight passage formed by an aligned groove in the head 26 and a slot in the plunger 28, the fishing line float 20 thus being freely movable along the fishing line.

Referring now with more particularity to FIG. 1, the float body 22 of the present invention is similar to the buoyant elements well-known and generally utilized floats. As illustrated, the float body 22 comprises a top hollow conical member 30 mounted over a bottom hollow semi-circular member 32, the members sealed to one another to form an air-tight buoyant element. The members 30,32 are preferably constructed of a bright and readily visible plastic material. The float body 22 may have any number of shapes, colors and sizes, as well known in the art.

As best illustrated in FIGS. 3 and 4, a recess 34 is located in the bottom of the float body 22. The recess 34 is preferably generally cylindrical in shape, extending inwardly of a bottom surface 36 of the float body along a centerline through the float 20.

The stem 24 has a first end 23 and a second or distal end 25. The stem 24 is connected to the float body 22 at the first end 23 and extends from the connection, through the recess 34, to a point beyond the bottom surface 36 of the float 20, the second or distal end 25. The stem 24 is generally cylindrical in shape, having an outside diameter less than the inside diameter of the recess 34. A distal portion 27 of the stem 24 positioned outside of the float body 22 has a reduced diameter. The distal end 25 of the stem 24 is enlarged, forming a stop 38.

The guide head 26 is mounted on the reduced diameter distal portion 27 of the stem 24 between a shoulder 40 at the transition of the main portion of the stem 24 with the reduced diameter portion, and the stop 38. The shoulder 40 prevents the guide head 26 from riding upwardly long the stem 24, and the stop 38 prevents the guide head 26 from being removed from the stem 24.

The line guide head 26 has a first end 42 and second end 44. The line guide head 26 is generally conical in shape, having an upper conical section 18 and a lower cylindrical section 19, with the first end 42 having a diameter which is smaller than the second end 44. A passage 46 extends through the center of the head 26 from the first end 42 to the second end 44 for acceptance of the reduced diameter section of the stem 24.

The first end 42 of the head 26 is flat, for engagement against the shoulder 40 of the stem 24. The second end 44 of the head 26 is likewise flat, with the stop 38 at the distal end 25 of the stem 24 engaging the head 26. Because of the orientation of the head 26 with respect to the float body 22, the first end 42 may also called a top end 42 and the second end 44 may also called a bottom end 44.

Moving from the first end 42 to the second end 44 of the head 26, the diameter of the head increases along a conically-shaped section before terminating at a trough 48. The trough 48 extends circumferentially around the head 26. Outwardly of the trough 48, a rim 50 extends upwardly towards the first end 42.

Most importantly, and as best illustrated in FIG. 2, a notch 52 extends radially inwardly from the outer edge of the head 26 at the second end 44 thereof. The notch 52 preferably extends inwardly approximately the same distance as the innermost portion of the trough 48.

Further, a groove 54 is positioned in the line guide head 26 opposite the notch 52, as illustrated in FIGS. 2–4. The groove 54 extends into the tapering or conical section 18 of the head 26 The groove 54 extends through the outer peripheral edge of the head 26 at the rim 50, as well as the trough 48, at two points. Thus, the groove 54 is generally "U"-shaped, with its ends intersecting at the second end 44 of the head 26, the groove forming a passage from one area of the second end 44 upwardly towards the first end 42 and over a portion of the head 26 before leading back to the second end 44.

The plunger 28 is movably mounted over the stem 24 between the float body 22 and the line guide head 26. The plunger 28 is an annular member, comprising an outer wall 65 surrounding an inner passage or bore 62. The plunger 28 has a first portion 56 and a second portion 58. The wall 65 of the plunger 28 is generally cylindrical in shape at the first portion 56, the wall 65 having an outer diameter less than the inner diameter of the recess 34 in the float body 22 for positioning in the recess 34. The second portion 58 of the plunger 28 is also generally cylindrical in shape, with the wall 65 having an outer diameter greater than that of the recess 34, and thus greater than that of the first portion 56.

A shoulder 60 is formed at the transition in diameter of the wall 65 of the plunger 28 from the first portion 56 to the second portion 58. Engagement of the shoulder 60 with the float body 22 serves to limit the extent of upward travel of the plunger 28 along the stem 24.

The bore 62 allows for positioning of the plunger 28 on the stem 24. At the first portion 56 of the plunger 28, the bore 62 is countersunk, providing an enlarged diameter area for acceptance of a spring 64. The spring 64 is preferably a coil spring positioned over the stem 24 between the end of the recess 34 and the end of the enlarged diameter portion of the bore 62 in the plunger 28. The spring 64 has the effect of biasing the plunger 28 in a direction away from the float body 22, and thus towards the line guide head 26.

At the second portion 58 of the plunger 28 the bore 62 includes a conical countersunk area 63 for mating engagement with the conical portion of the head 26. A second area 66 of the bore 62 comprises a cylindrical shaped counterbore having a diameter large enough to accommodate the enlarged second end 44 of the head 26, including the rim 50. As illustrated in FIG. 3, the countersunk areas 63,66 are designed such that the head 26 will fit completely within the plunger 28, with the second end 44 of the head 26 being flush with a distal end 59 end of the plunger 28 located on the second portion 58.

Additionally, a slot 68 extends completely through the plunger 28, as illustrated in FIGS. 2–4. The slot 68 extends in a straight line through the wall 65 and bore 62. The slot 68 has a depth slightly greater than the distance by which the head 26 extends into the plunger 28 at the groove 54 in the head 26. When aligned, the slot 68 in the plunger 28 and the groove 54 in the head 26 form a passage through the float 20 large enough to accommodate a fishing line 74.

A tab 70 extends inwardly into the bore 62 from the inside of the wall 65 of the plunger 28 in the second area 66 opposite the slot 68, as illustrated in FIG. 2. The tab 70 has a width slightly less than the notch 52 in the head 26 and a depth such that when aligned, the tab 70 extends partially into the notch 70. The tab 70 is positioned on the plunger 28 so that when engaging the notch 70, the slot 68 in the plunger is aligned with the groove 54 in the head 26.

The stem 24, plunger 28 and head 26 are preferably constructed of the same durable and brightly colored plastic as the remainder of the float 20. These elements may be molded or the like.

Use of the float 20 of the present invention will now be described. In general, the user of the float 20 may position the float 20 on a fishing line 74 in one of two manners First, the user may attach the float 20 in a manner whereby the float is secured in immovable fashion to the line at a fixed point. Second, the user may attach the float 20 to the line 74 in a manner where by the float 20 may move freely along the line 74.

FIG. 5 illustrates the float 20 of the present invention as mounted in secure, immovable fashion to the fishing line 74. As illustrated, the line 74 extends from a fishing pole or other device into the notch 52 in the space of the notch between the head 26 and the engaged tab 70. The line 74 then extends upwardly along the conical section 18 of the head 26 inside of the rim 50. The line 74 encircles the head 26, extending back down along the conical section 18 through the trough 48 inside of the rim 50, exiting the mating head 26 and plunger 28 at the notch 52 and then continuing on until terminating at a hook.

The method of mounting the float 20 to the fishing line 74 in this manner is as follows. First, a user pushes the plunger 28 upwardly against the spring 62 away from the head 26, into the position illustrated in FIG. 4. The user then wraps the line 74 around the conical section 18 of the head 26 between the first and second ends 42,44, as illustrated in FIG. 5. Notably, the line 74 is positioned within the rim 50 in this position, the line 74 passing through the rim 50 only at the notch 52, where the line 74 exits and enters. The user then releases the plunger 28, allowing the spring 64 to force the plunger 28 downwardly, pinching the line 74 between the plunger 28 and head 26. After releasing the plunger 28, the user ensures that the tab 70 is in mating engagement with the notch 52.

In this position, the float 20 is affixed to the fishing line 74 in a secure manner, not moveable with respect thereto. Locking occurs as a result of the spring force pushing the plunger 28 against the line 74, which in turn presses the line 74 against the head 26. Sufficient force is generated by the spring 62 that friction generally prohibits relative movement of the line 74 with respect to the float 20, thus maintaining the float 20 in a fixed position along the line 74.

Further, the float 20 engages the line 74 in a manner which does not allow the line 74 to readily break free from the locking arrangement. First, the upward extension of the rim 50 to the plunger 28 generally prohibits the line 74 from slipping over the rim 50 and thus out from between the head 26 and plunger 28. Further, the trough 48 provides a secure place for the line 74 to be firmly seated. Still further, the engagement of the tab 70 with the notch 52 generally prohibits the line 74 from moving out of the notch 52.

FIG. 6 illustrates the float 20 as mounted on the fishing line 74 in a second position in which the float 20 may move freely along the line 74. In this position, the fishing line 74 extends through an enclosed passage formed by the aligned slot 68 in the plunger 28 and corresponding groove 54 in the head 26.

Mounting of the float 20 to the line 74 in this manner is as follows. First, a user pushes the plunger 28 upwardly against the spring 62 away from the head 26, into the position illustrated in FIG. 4. The user then extends the fishing line 74 into the groove 54 in the head 26. The user then releases the plunger 28, the spring 62 thereby pressing the plunger 28 downwardly into the position illustrated in FIGS. 3 and 6.

In order to maintain alignment of the slot 68 in the plunger 28 and the groove 54 in the head 26, respectively, the user aligns the tab 70 on the plunger 28 with the notch 52 in the head 26.

When mounted on a line 74 in the manner illustrated in FIG. 6, the float 20 may freely move along the line 74. In particular, the line 74 extends through a passage in the mating head 26 and plunger 28 as formed by the aligned slot 68 and groove 54. This passage has a size which is larger than the outer diameter of the line 74 for free movement of the line 74 with respect to the float 20. More importantly, however, is the fact that the slot 68 in the plunger 28 and the groove 54 in the head 26, are positioned and sized so that the line 74 may pass in a straight line through from one side of the plunger 28 through the plunger 28, head 26 and through to the opposite side of the plunger 28. Passage of the line 74 through the float 20 in straight-line fashion is preferred, since it facilitates movement of the float 20 along the line 74.

The float 20 of the present invention solves many of the problems associated with prior art floats and satisfies the desire of fishermen to mount floats on a fishing line in different manners. As described above, the float 20 includes means for locking the float securely to the line 74 at a fixed point. This method of mounting is very secure, preventing the line 74 from becoming dislodged from or sliding with respect to the float 20, contrary to many other methods of mounting floats.

Further, the float 20 includes means for mounting the float freely along the line 74. This method of mounting is particularly useful when, as stated above, the fisherman desires for the float 20 to slide along the line 74 to different positions. Thus, when casting, the float 20 mounted in this fashion will slide down to the hook. Once in the water, however, a weight 76 on the line 74 located near the hook pulls the line 74 through the float 20 for some distance, thus allowing the hook to depend downwardly into the water some distance below the float 20. Movement of the line 74 with respect to the float 20 is facilitated by the straight line passage formed by the aligned slot 68 in the plunger 28 and groove 54 in the head 26 thereby reducing binding of the line 74.

While a single coil spring 62 is the preferred means for biasing the plunger 28 downwardly against the head 26, other means for biasing may be employed. For example, a number of smaller springs might be positioned between the float body 20 and the plunger 28.

It is also possible for the line guide head 26 to be formed as an integral portion of the stem 24 itself, as opposed to a separate element.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A fishing line float, said float comprising:

a float body, said body having a recess therein;

a stem, said stem having a first end connected to said body and a second end located outwardly of said body;

a head mounted on said second end of said stem, said head having a top end and bottom end and having a conical section between said ends, a notch extending radially into said head at said bottom end, and a groove extending into said head, said groove passing through opposite portions of said bottom end and a portion of said conical section, said groove lying in a plane extending parallel to a line passing through said top and bottom ends of said head;

a plunger movably mounted on said stem between said head and said body, said plunger comprising an annular element with a wall surrounding a bore therethrough for acceptance of said stem, and further including a first recessed portion for acceptance of said head, a slot extending through said plunger wall for alignment with said groove in said head, whereby a passage is formed through said mating head and plunger which allows a fishing line to extend therethrough in a straight-line, and a tab extending inwardly from said wall, said tab sized for partial engagement with said notch in said head; and means for biasing said plunger towards said head.

2. The fishing line float of claim 1, wherein said groove in said head is positioned opposite said notch in said head.

3. The fishing line float of claim 1, wherein said plunger includes a wall portion for engaging said head radially outwardly of said groove in said head when said plunger engages said head.

4. The fishing line float of claim 1, wherein said means for biasing comprises a spring.

5. The fishing line float of claim 1, wherein said head further includes a trough positioned therein near said bottom end.

6. The fishing line float of claim 1, wherein said head further includes an upwardly extending rim positioned at a peripheral edge of said head at said bottom end.

7. The fishing line float of claim 6, wherein a trough extends into said head radially inwardly of said rim.

8. The fishing line float of claim 1, wherein a stop is positioned at said distal end of said stem for preventing removal of said head therefrom.

9. A fishing line attachment mechanism for use with a fishing line float body, said body having a recess therein, comprising:

a stem extending through said recess, said stem having a first end connected to said body and a second end located distal of said body;

a head positioned on said stem outwardly of said body, said head having a groove extending therethrough and further including a notch extending radially into said head;

a plunger movably mounted on said stem, said plunger having an outer wall and an inner recessed portion for mating engagement with said head, said plunger having an inwardly extending tab for engagement with said notch and further including a slot extending through said wall and said recessed portion; and means for biasing said plunger towards said head.

10. The attachment of claim 9, wherein said groove in said head is generally "U"-shaped, and lies in a plane extending parallel to said stem.

11. The attachment of claim 9, wherein said slot in said attachment extends generally perpendicular to said stem.

12. The attachment of claim 9, wherein when said plunger engages said head, said groove in said head and said slot in said plunger form a passage through which a fishing line may extend.

* * * * *